United States Patent
Humphreys, III (10) Patent No.: US 9,097,357 B2
(45) Date of Patent: Aug. 4, 2015

(54) WATER STORAGE RESERVE AND RETURN METHOD AND APPARATUS

(71) Applicant: Hugh Humphreys, III, Scottadale, AZ (US)

(72) Inventor: Hugh Humphreys, III, Scottadale, AZ (US)

(*) Notice: Subject to any disclaimer, the term of this patent is extended or adjusted under 35 U.S.C. 154(b) by 419 days.

(21) Appl. No.: 13/624,943

(22) Filed: Sep. 23, 2012

(65) Prior Publication Data

US 2014/0083509 A1    Mar. 27, 2014

(51) Int. Cl.
| | |
|---|---|
| *E03B 11/02* | (2006.01) |
| *F16K 21/00* | (2006.01) |
| *E03B 11/10* | (2006.01) |

(52) U.S. Cl.
CPC ............. *F16K 21/00* (2013.01); *E03B 11/10* (2013.01); *E03B 11/02* (2013.01); *Y10T 137/0318* (2015.04); *Y10T 137/3115* (2015.04); *Y10T 137/7838* (2015.04)

(58) Field of Classification Search
CPC ......... E03B 11/02; E03B 11/04; E03B 11/06; E03B 2011/005; E03B 7/075; Y10T 137/3115; Y10T 137/3124
See application file for complete search history.

(56) References Cited

U.S. PATENT DOCUMENTS

| | | | | |
|---|---|---|---|---|
| 2,931,382 | A * | 4/1960 | Cirillo | 137/357 |
| 3,346,014 | A | 10/1967 | Jacuzzi | |
| 3,643,678 | A * | 2/1972 | Genrich | 137/209 |
| 3,977,474 | A * | 8/1976 | Boegli | 169/9 |
| 4,239,054 | A * | 12/1980 | Van Rijn | 137/209 |
| 4,284,097 | A | 8/1981 | Becker | |
| 4,718,452 | A | 1/1988 | Maitland | |
| 4,922,943 | A * | 5/1990 | Gill | 137/1 |
| 4,962,789 | A * | 10/1990 | Benscoter | 137/571 |
| 5,632,338 | A * | 5/1997 | Hunter | 169/9 |
| 5,901,744 | A * | 5/1999 | Richards | 137/565.34 |
| 5,975,133 | A * | 11/1999 | Nalewajski | 137/587 |
| 6,378,546 | B1 * | 4/2002 | Hansen | 137/208 |
| 6,971,399 | B2 * | 12/2005 | Cowan | 137/209 |

OTHER PUBLICATIONS http://www.apswater.com/articie.asp? id=215&title=How_a_bladder_pressure_tank_works_and_how_to_use_it_for_low_pressure_problems.

* cited by examiner

*Primary Examiner* — John Fox (57) ABSTRACT

An apparatus consisting of check valves (1, 2, 3) and one or more pressure tanks (4) plumbed into a water service line to provide a method of storing, reserving and delivering said stored water through the water service line to both the water user and the water supply. This method and apparatus can be used for emergency water supply by the water user or reduce water peak demand challenges caused by fluctuating water pressure if used extensively throughout a water supply system. This method and apparatus can create individual water storage collectives that can share water between users.

7 Claims, 16 Drawing Sheets

Apparatus Example

Fig. 14

Apparatus Example

Fig. 16

Check Valve Assembly

WATER STORAGE RESERVE AND RETURN METHOD AND APPARATUS

CROSS-REFERENCED TO RELATED APPLICATIONS

This application claims the benefit of provisional patent application Ser. No. 65/550,398, filed 2011 Oct. 22 by the present inventor, which is incorporated by reference.

BACKGROUND

Prior Art

The following is a tabulation of some prior art that presently appears relevant:

| U.S. Pat. No. | U.S Class | Issue Date | Patentee |
| --- | --- | --- | --- |
| 4,718,452 | 137/592 | 1988-1-12 | Maitland |
| 3,346,014 | 137/209 | 1967-10-10 | Jacuzzi |
| 4,284,097 | 137/218 | 1981-8-18 | Becker |

This method and apparatus relates to water supply demand challenges comprising fluctuating water pressure and available water reserves caused by peak water demand, emergency water demand requirements or service or supply interruptions for water supply systems, and more particularly to a water storage, reserve and return method and apparatus for mitigation of same.

The method of combining a pressure tank with multiple check valves with various opening weights in various configurations, comprising an apparatus incorporating an inlet, outlet and return to my knowledge has never been proposed.

There is a large amount of prior art that describe pressure tanks and check valve configurations, however my search of prior art has not shown these two components combined while utilizing a return.

One patent, U.S. Pat. No. 4,718,452 emergency potable water storage, Douglas W. Maitland, Jan. 12, 1988, utilizes a pressure tank with an attached spring check valve plumbed between water supply and pressure tank, in this prior art the check valve is intended to function as a backflow preventer.

With the exception of the above listed patent prevailing art indicates the use of pressure tanks in combination with pumps. For example, U.S. Pat. No. 3,346,014 pressure tank assembly for water pressure system, Candido Jacuzzi Oct. 10, 1967. Prior art for multiple check valve assemblies shows them venting to atmosphere such as reduced pressure backflow preventers. For example U.S. Pat. No. 4,284,097 in line back flow preventer, Bernard B. Becker, John K. Bowman and Cyril A. Randall, Aug. 18, 1981.

Prior art for reduced pressure backflow preventers, check valves and pressure tanks comprising captive air tanks, bladder tanks, hydro-pneumatic tanks and elevation tanks are abundant and easily searched and found.

This method and apparatus does not seek to improve pressure tanks or check valves. The method and apparatus described here utilizes pressure tanks and check valves to accomplish the intent of the method and apparatus, which is to store, reserve and return water to the water supply or the water user. Improvements to pressure tanks and check valves will not affect the intent of the method and apparatus described here. Size or materials of construction for components described do not change the intent for this method and apparatus.

SUMMARY

One analogy to describe said method and apparatus could be like breathing, receiving water from the water supply into the apparatus during normal or relatively higher pressure situations and releasing water to the water supply and/or to the water user during low pressure situations that commonly occur in water systems during peak demand, emergency demand and service or supply interruptions. By assembling pressure tanks and check valves in various configurations said apparatus can be utilized in diverse ways to mitigate water supply demand challenges in many ways.

ADVANTAGES

Accordingly two advantages for developed countries are apparent; use of the method and apparatus on a large scale could be beneficial beyond the obvious, for example, by incorporating language requiring installation of said apparatus into plumbing, construction and water system development codes or regulations could, over time, lower costs associated with water system infrastructure development, maintenance and operations. Water utilities, water purveyors, water system operators and water users reap the benefits. Developers could benefit because water infrastructure development costs may decline as apparatus use increases. Utilizing said apparatus throughout water supply and delivery systems could significantly reduce water demand challenges for water suppliers, water utilities, water purveyors and water users, while lowering costs. This method and apparatus can effectively create individual water user water storage that can be shared throughout a water system, leading to additional, decentralized water storage for water systems. Still further advantages will become apparent from a study of the following description and the accompanying drawings.

Accordingly there are many advantages for developing countries, including the above but also by using the apparatus in rural communities where human water hauling is the only means of delivering water, use of the apparatus can bring water sources closer to where the water is needed reducing hauling distances with relatively smaller infrastructure costs.

DRAWINGS

Figures

DETAILED DESCRIPTION

Figure 1:
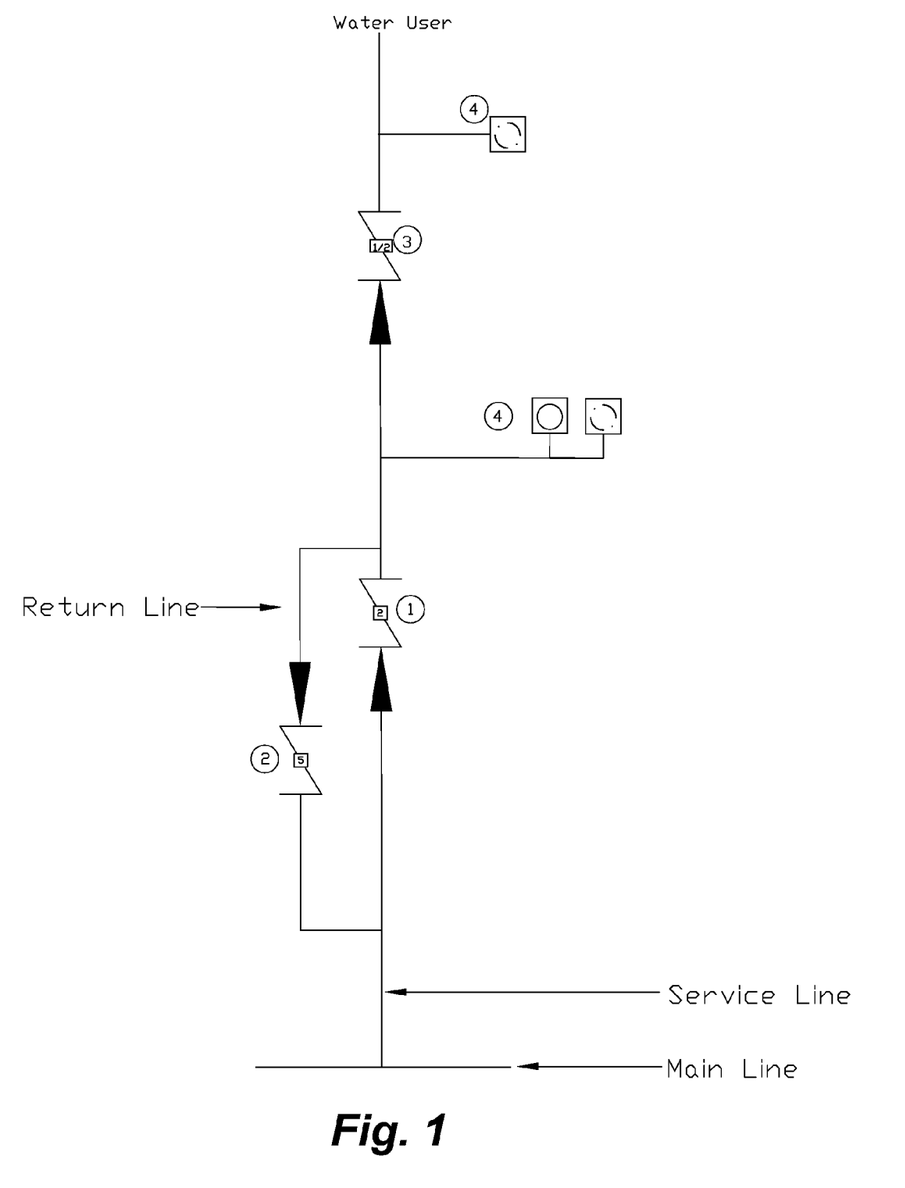
FIG. 1 is a diagrammatic view showing an embodiment of the apparatus.

Referring to FIG. 1 for details of an embodiment of this method and apparatus the same comprises multiple captive air tanks 4 for additional storage if desired and spring loaded check valves 1, 2 and 3 with spring weights of two, five and one half pound respectively. Check valves 1 and 3 are plumbed directly in the service line, direction of flow toward the water user. Using T-connections and elbows the return line is plumbed into the service line on both sides of and around check valve 1, check valve 2 is plumbed in the return line; direction of flow is toward the main line. Captive air tanks 4 are plumbed into the service line using a T-connection between check valves 1 and 3 and also check valve 3 and the water user. Water stored in captive air tank 4 between check valve 3 and the water user is reserved for use by the water user only.

Figure 2:
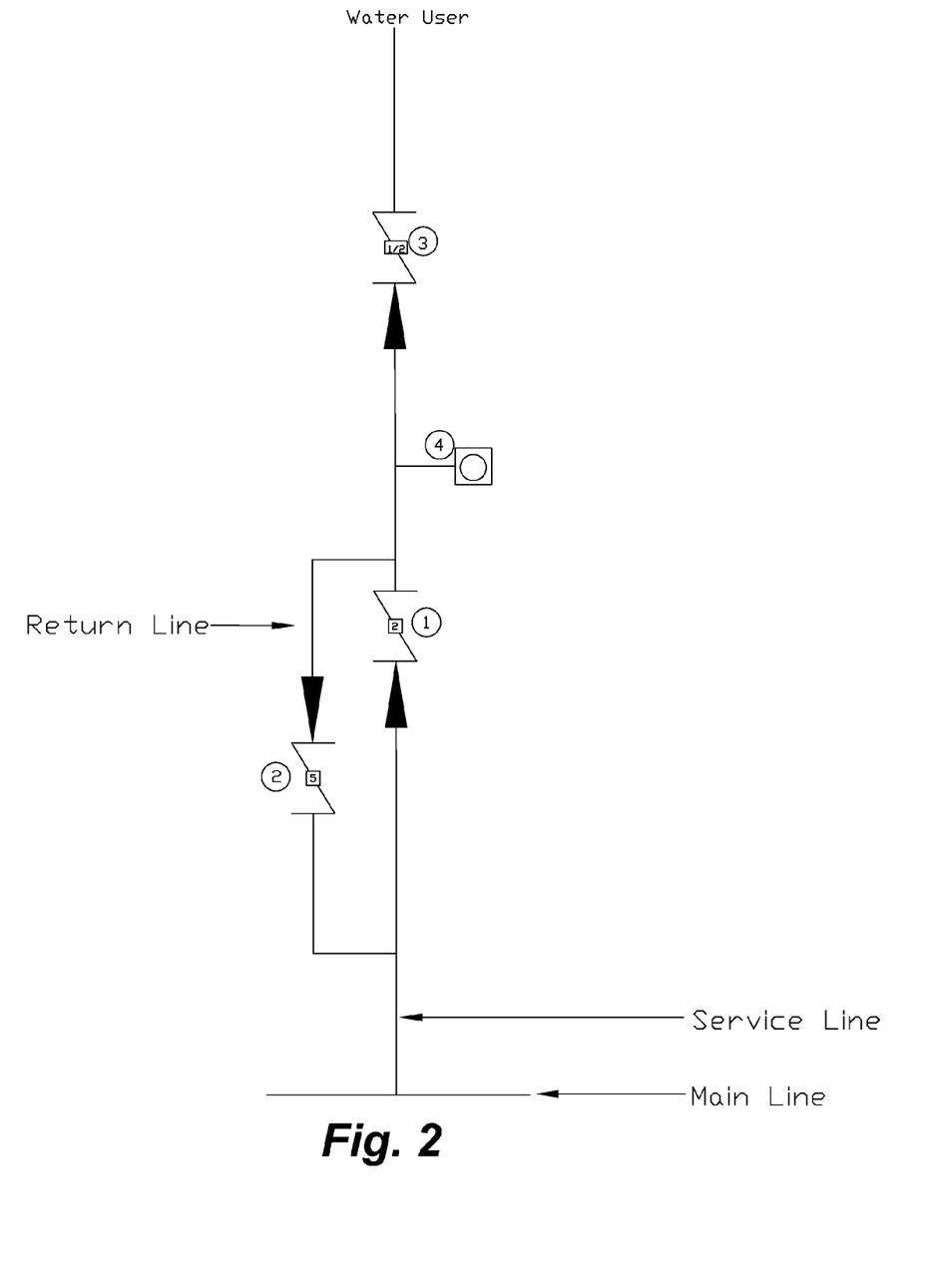
FIG. 2 is a diagrammatic view showing an embodiment of the apparatus.

Referring to the FIG. 2 for details of an embodiment of this method and apparatus the same comprises a captive air tank 4 and spring loaded check valves 1, 2 and 3 with spring weights of two, five and one half pound respectively. Check valves 1 and 3 are plumbed directly in the service line, direction of flow toward the water user. Using T-connections and elbows the return line is plumbed into the service line on both sides of and around check valve 1, check valve 2 is plumbed in the return line; direction of flow is toward the main line. Captive air tank 4 is plumbed into the service line using a T-connection between check valves 1 and 3.

Operation

It is understood that the description that follows is only one of an unknown number of possible scenarios or conditions under which the apparatus will function. The following description is detailed to show the operation of the apparatus in accomplishing the method for storing, reserving and returning water to the water user or the water supply. This one description is not intended to limit the operational intent of the method and apparatus. It is further understood that the following embodiment using a captive air tank and spring check valves will not limit the use of other types of pressure tanks or check valves. It is understood that there is pressure loss due to friction caused by water flow through pipes; this will not change the intent of this method and apparatus.

Figure 3:
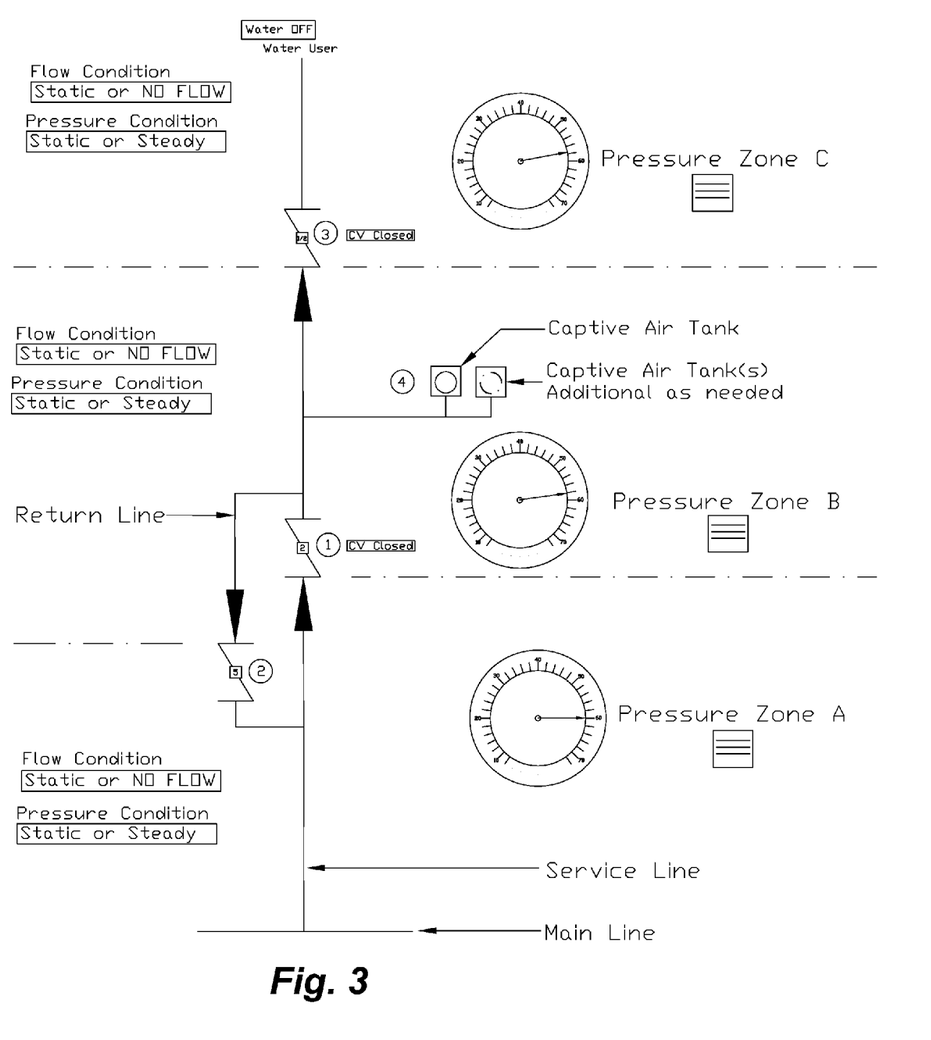
FIG. 3 is a diagrammatic view showing the operation of the apparatus.

Beginning with FIG. 3

FIG. 3 there is no demand or flow; check valves 1, 2 and 3 are closed. Captive air tank 4 is filled to capacity. Pressure is steady.

Figure 4:
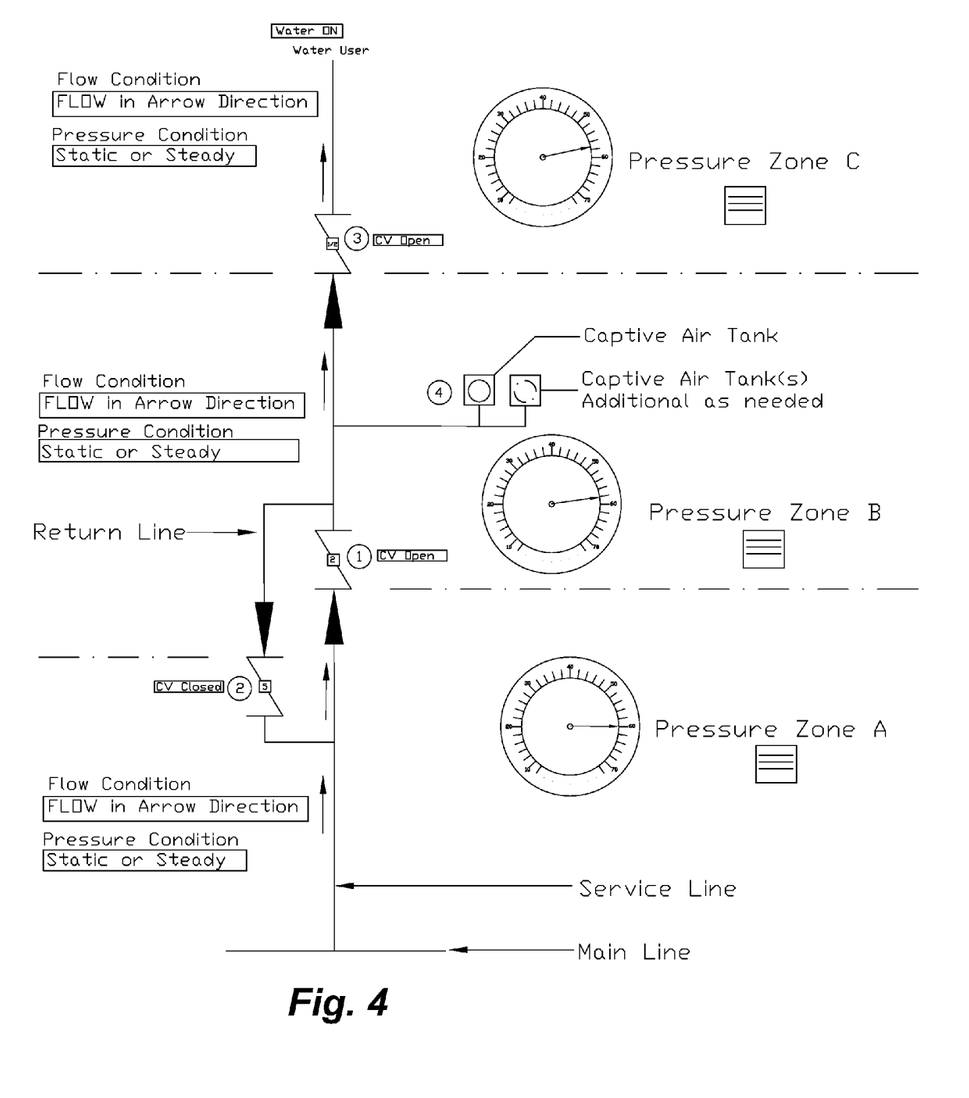
FIG. 4 is a diagrammatic view showing the operation of the apparatus.

FIG. 4 there is demand from the water user and there is flow. Main line and service line flow capacity meet or exceed demand. Check valves 1 and 3 are open. Check valve 2 is closed. Captive air tank 4 is static or inactive. Pressure is steady.

Figure 5:
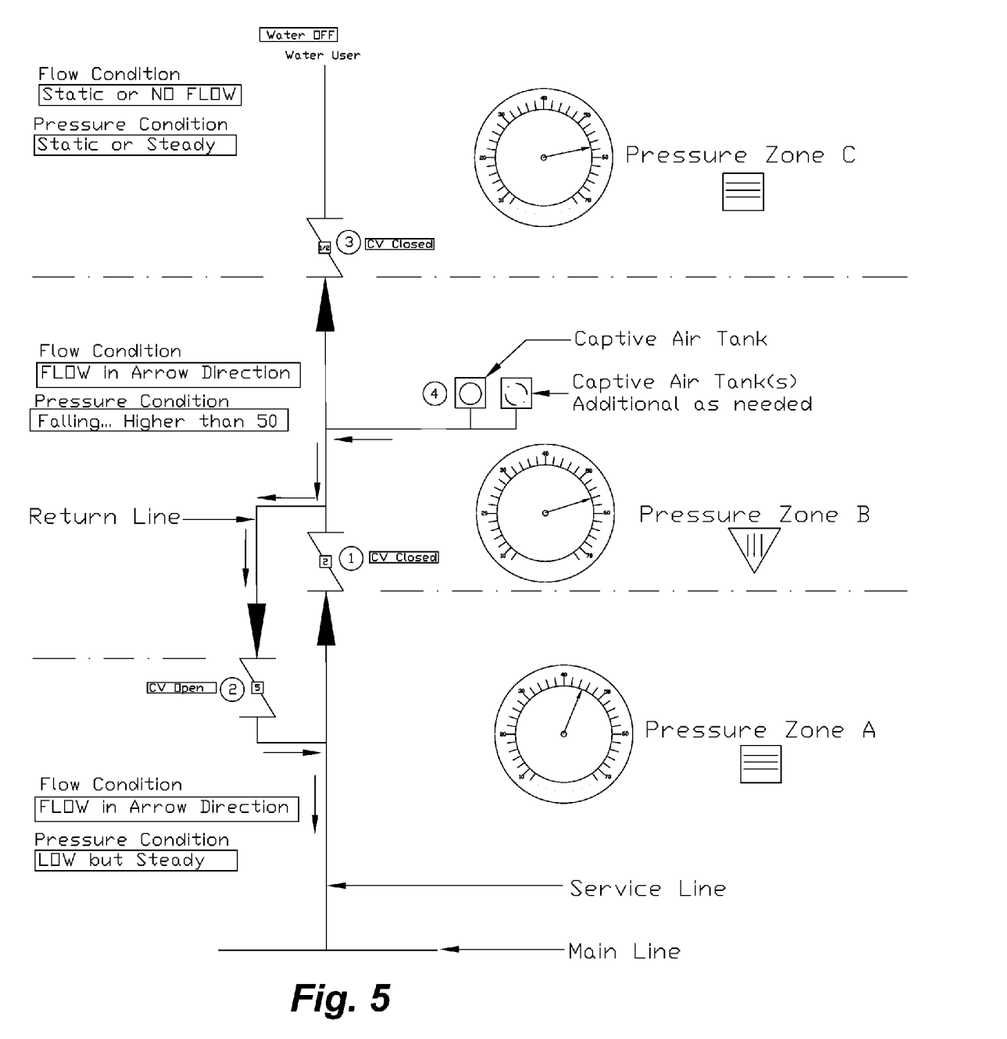
FIG. 5 is a diagrammatic view showing the operation of the apparatus.

FIG. 5 there is no water demand and initially there is no flow in any direction. Check valve 3 is closed, maintaining pressure in pressure zone c. Pressure decreases in the main line, decreasing pressure in pressure zone a, eventually stabilizing at 45 psi. During the pressure drop in pressure zone a, check valve 1 closes when pressure in pressure zone a becomes two pounds higher than pressure zone b. As pressure continues to fall in pressure zone a there is no flow. The main line continues to loose pressure decreasing pressure in pressure zone a. When pressure in pressure zone a falls more than 5 lbs below pressure zone b check valve 2 opens, water flows from captive air tank 4 through return line and service line to main line. Main line pressure stabilizes at 45 psi. Captive air tank 4 continues to release water until pressure zone b reaches 50 psi. Check valve 2 closes. Flow stops. Captive air tank 4 has been partially discharged.

Figure 6:
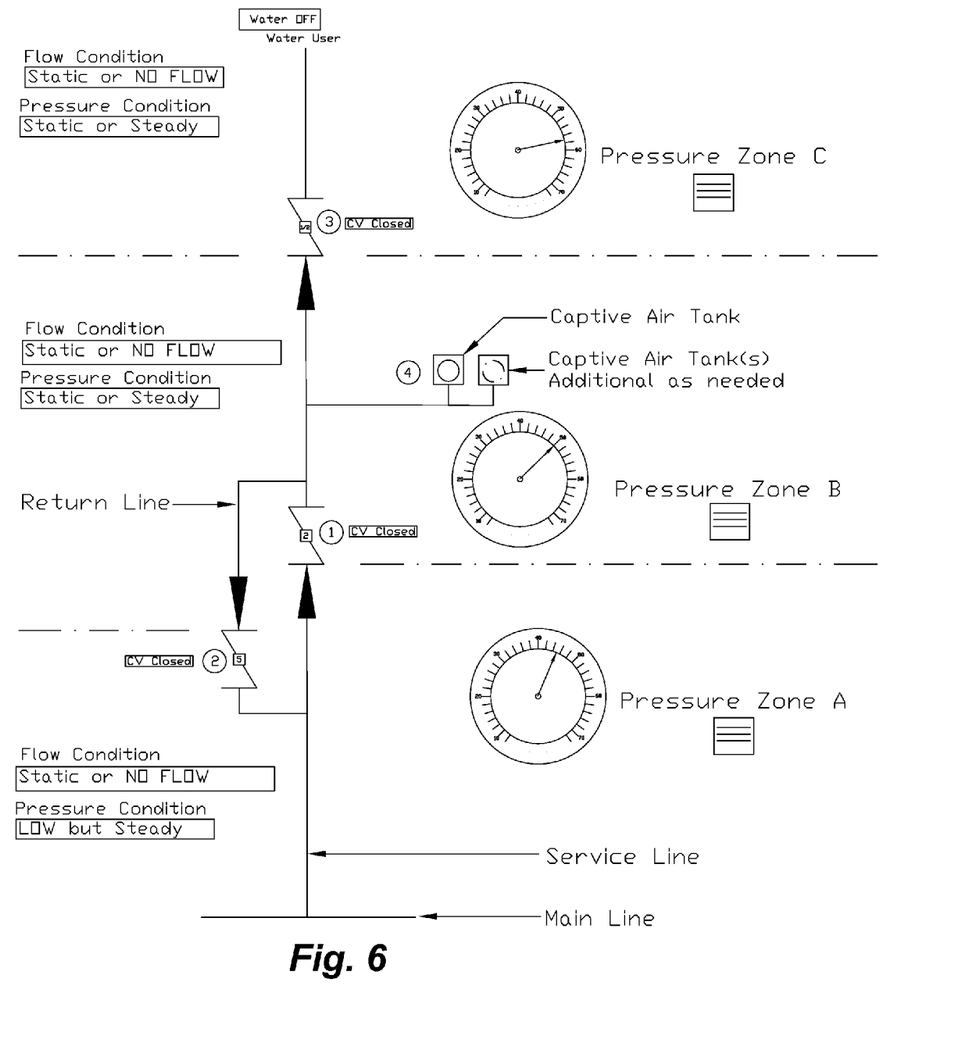
FIG. 6 is a diagrammatic view showing the operation of the apparatus.

FIG. 6 there is no water user demand. Check valve 3 remains closed. Check valve 2 closes when pressure zone b pressure decreases to 50 psi. Flow stops. Pressures stabilize in pressure zone a, 45 psi, pressure zone b, 50 psi, and pressure zone c remains constant at 57.5 psi. All check valves are now closed. Captive air tank 4 has been partially discharged.

Figure 7:
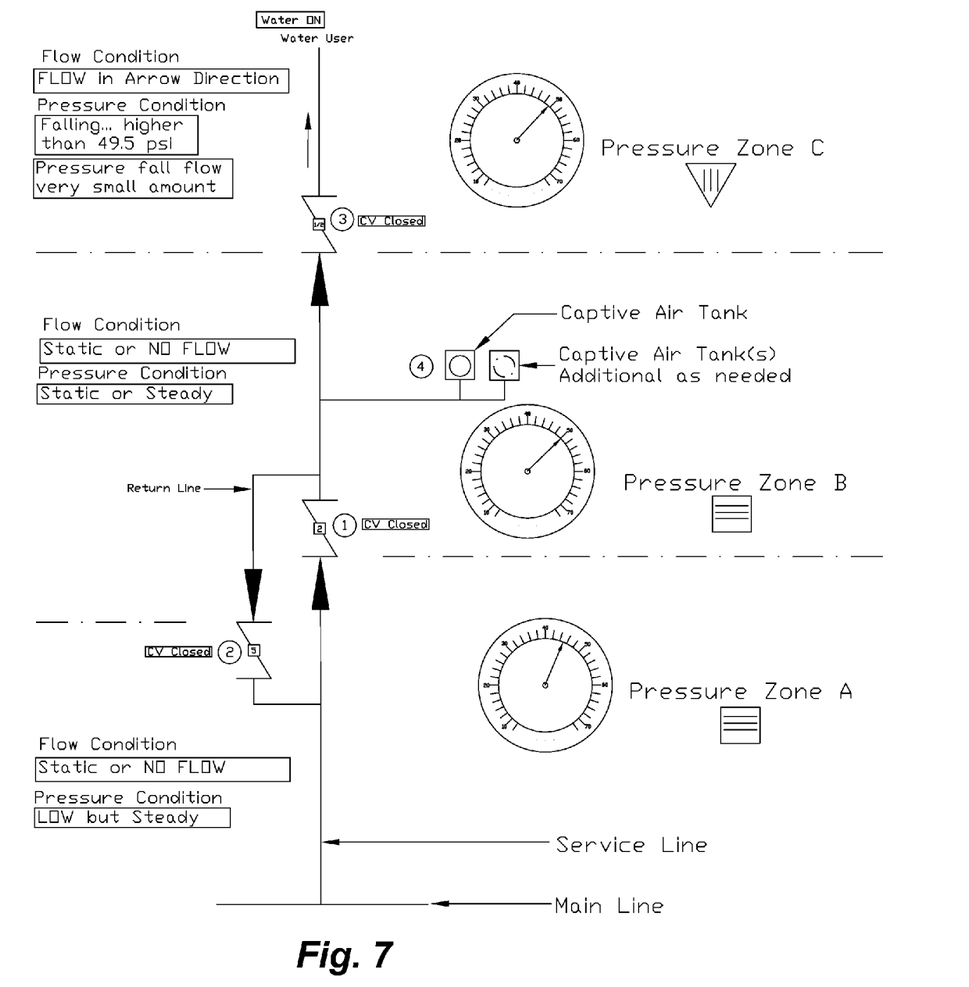
FIG. 7 is a diagrammatic view showing the operation of the apparatus.

FIG. 7 there is demand from the water user. Initially all check valves remain closed. Water flows in pressure zone c toward water user until pressure falls in pressure zone c from 57.5 psi to 49.5 psi. Flow is a very small amount and pressure drop is very fast approaching instantaneous.

Figure 8:
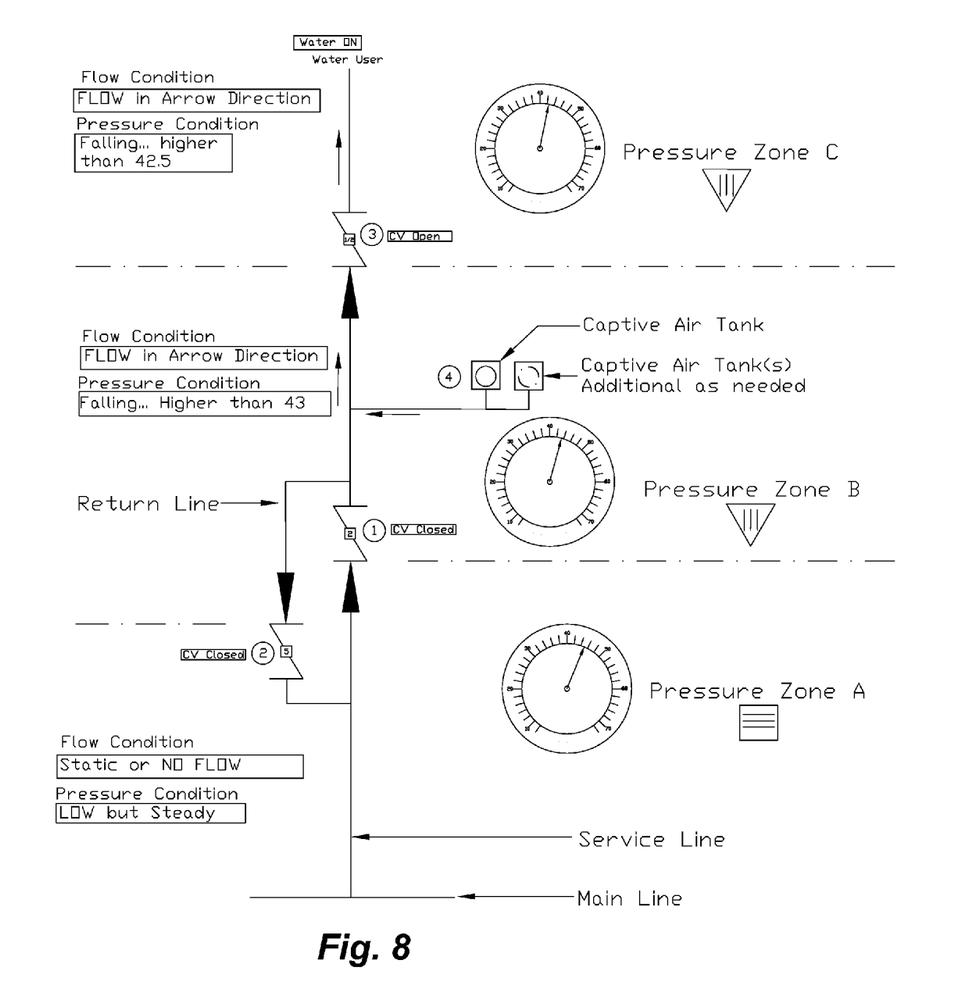
FIG. 8 is a diagrammatic view showing the operation of the apparatus.

FIG. 8 Water user demand continues. Check valve 3 opens at 49.5 psi. Check valves 1 and 2 remain closed. Captive air tank 4 discharges water into service line and water flows toward water user. Pressure is falling in pressure zone b and pressure zone c. Pressure in pressure zone a is steady at 45 psi. Captive air tank 4 is discharging.

Figure 9:
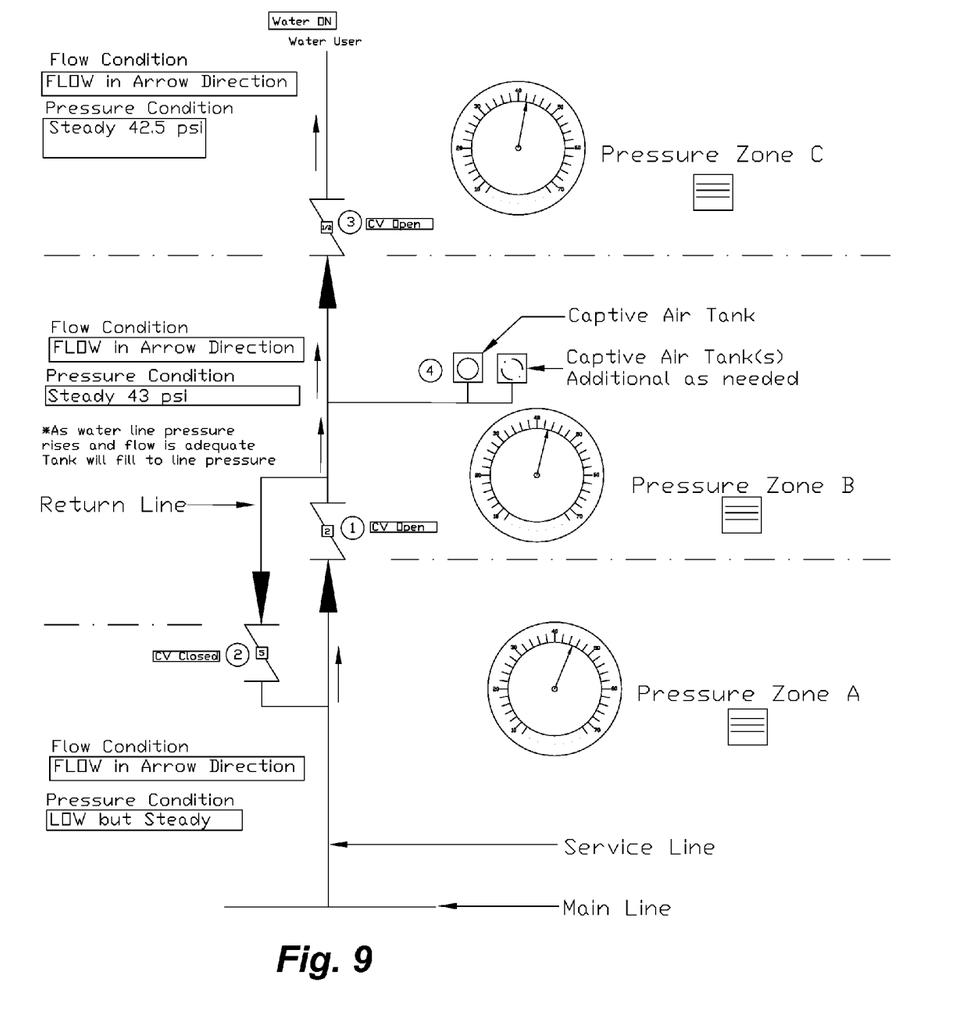
FIG. 9 is a diagrammatic view showing the operation of the apparatus.

FIG. 9 Water user demand continues. Pressure in pressure zone a remains steady at 45 psi. Pressure in pressure zone b has fallen to 43 psi and steady. Pressure in pressure zone c has fallen to 42.5 psi and steady. Check valve 1 opens and check valve 3 remains open. Water flows from the main line through the service line to the water user. The main line and service line flow capacity meet demand. Captive air tank 4 remains partially discharged.

Figure 10:
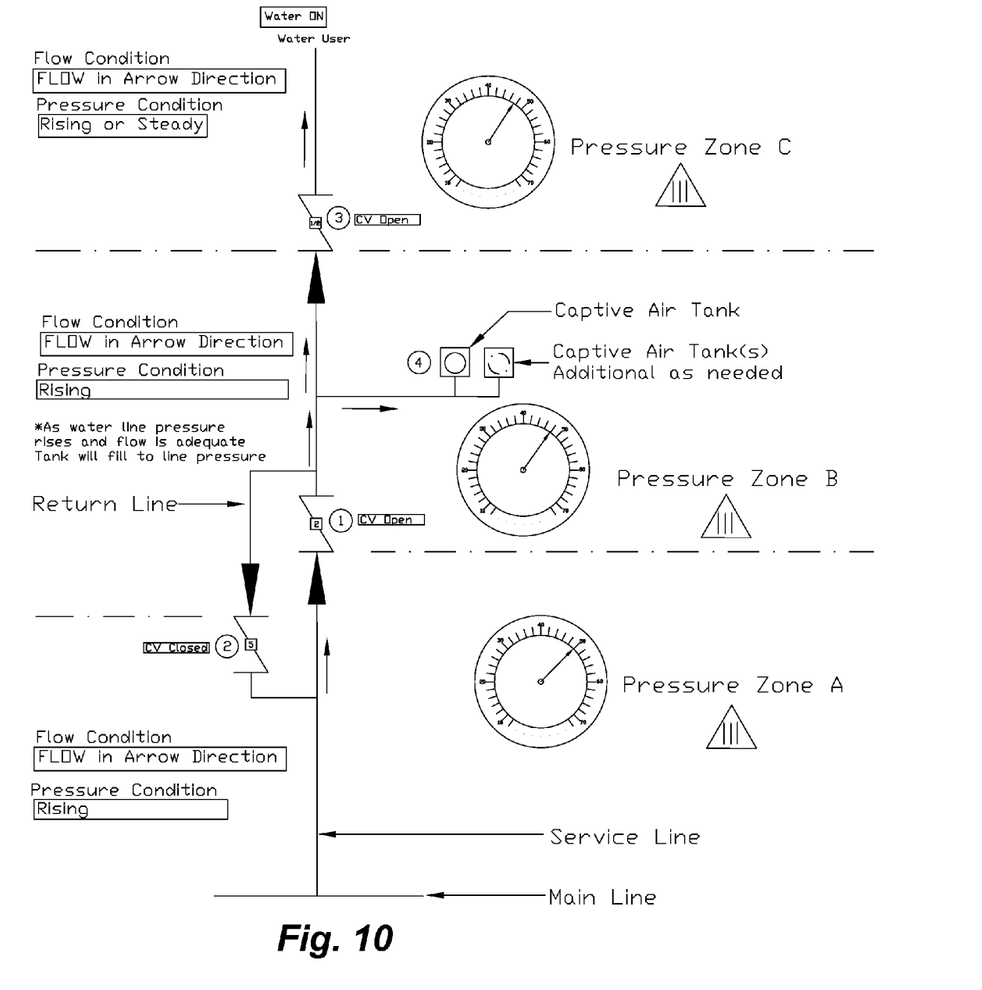
FIG. 10 is a diagrammatic view showing the operation of the apparatus.

FIG. 10 water user demand continues. Main line and service line flow capacity exceed demand. Pressure in main line has risen to 50 psi and continuing to rise. Pressure zone a is 50 psi and rising. Pressure zone b is 48 psi and rising. Pressure zone c is 47.5 psi and rising. Water flows from the main line through the service line to the water user and captive air tank 4 begins to recharge.

Figure 11:
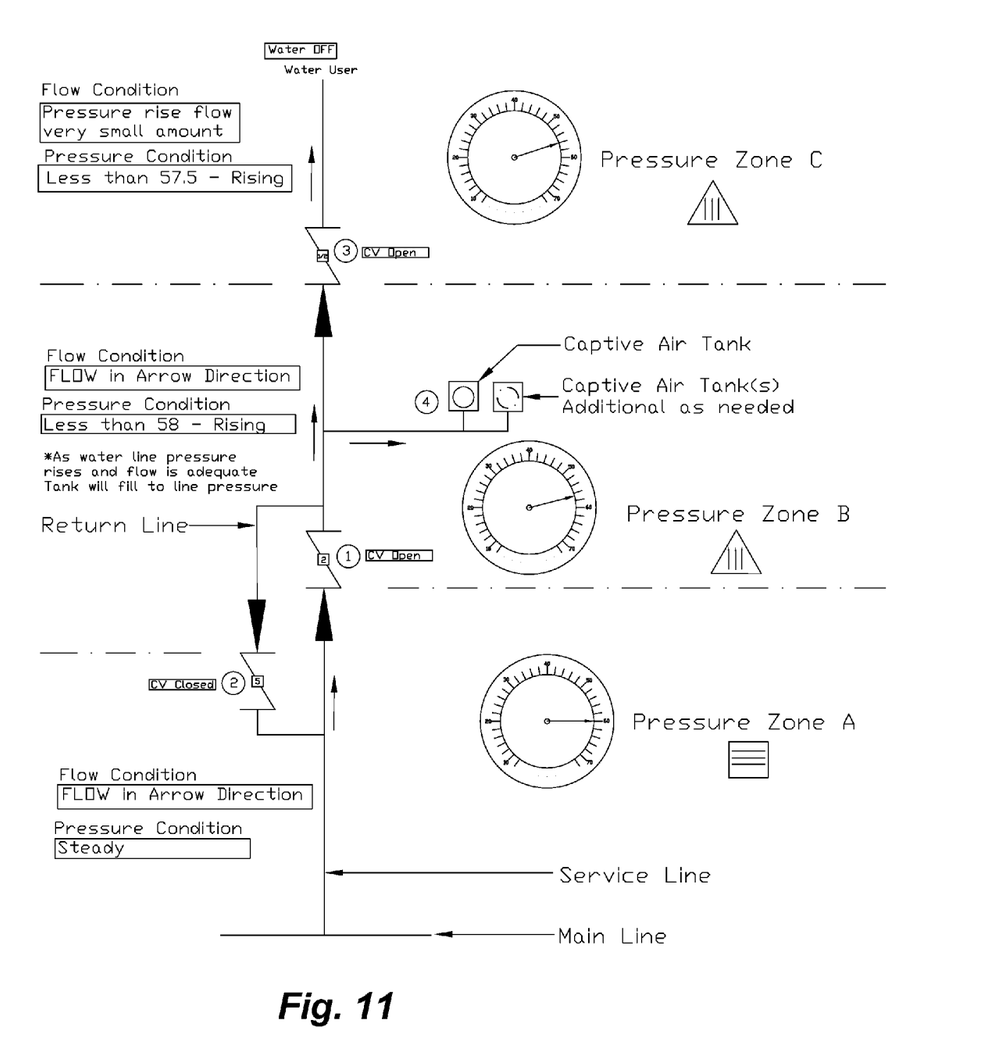
FIG. 11 is a diagrammatic view showing the operation of the apparatus.

FIG. 11 Water user demand stops. Pressure continues to rise in all pressure zones until it stabilizes at 60 psi in pressure zone a, 58 psi in pressure zone a and 57.5 in pressure zone c. Flow in pressure zone c is minimal and check valve 3 closes. Flow in pressure zone b and pressure zone a continue. Captive air tank 4 continues to recharge until full.

Figure 12:
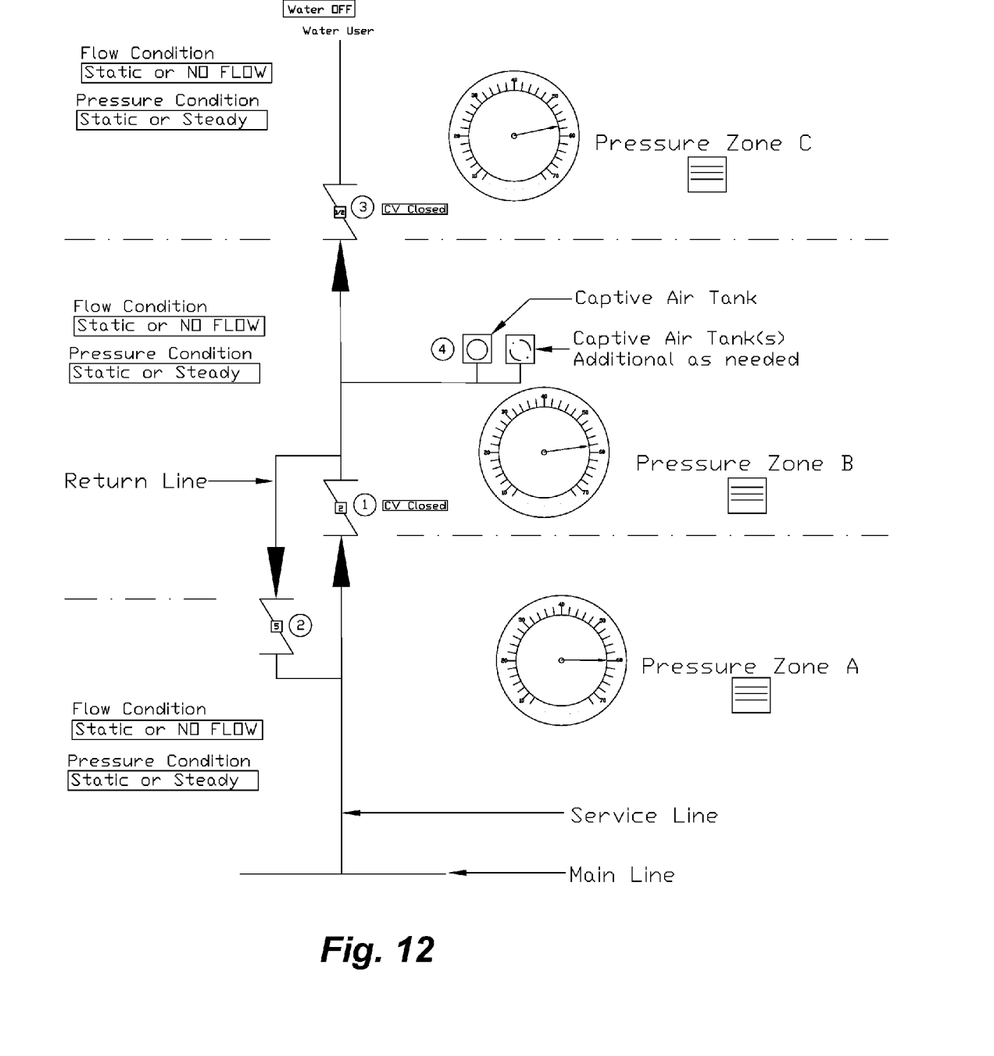
FIG. 12 is a diagrammatic view showing the operation of the apparatus.
Figure 13:
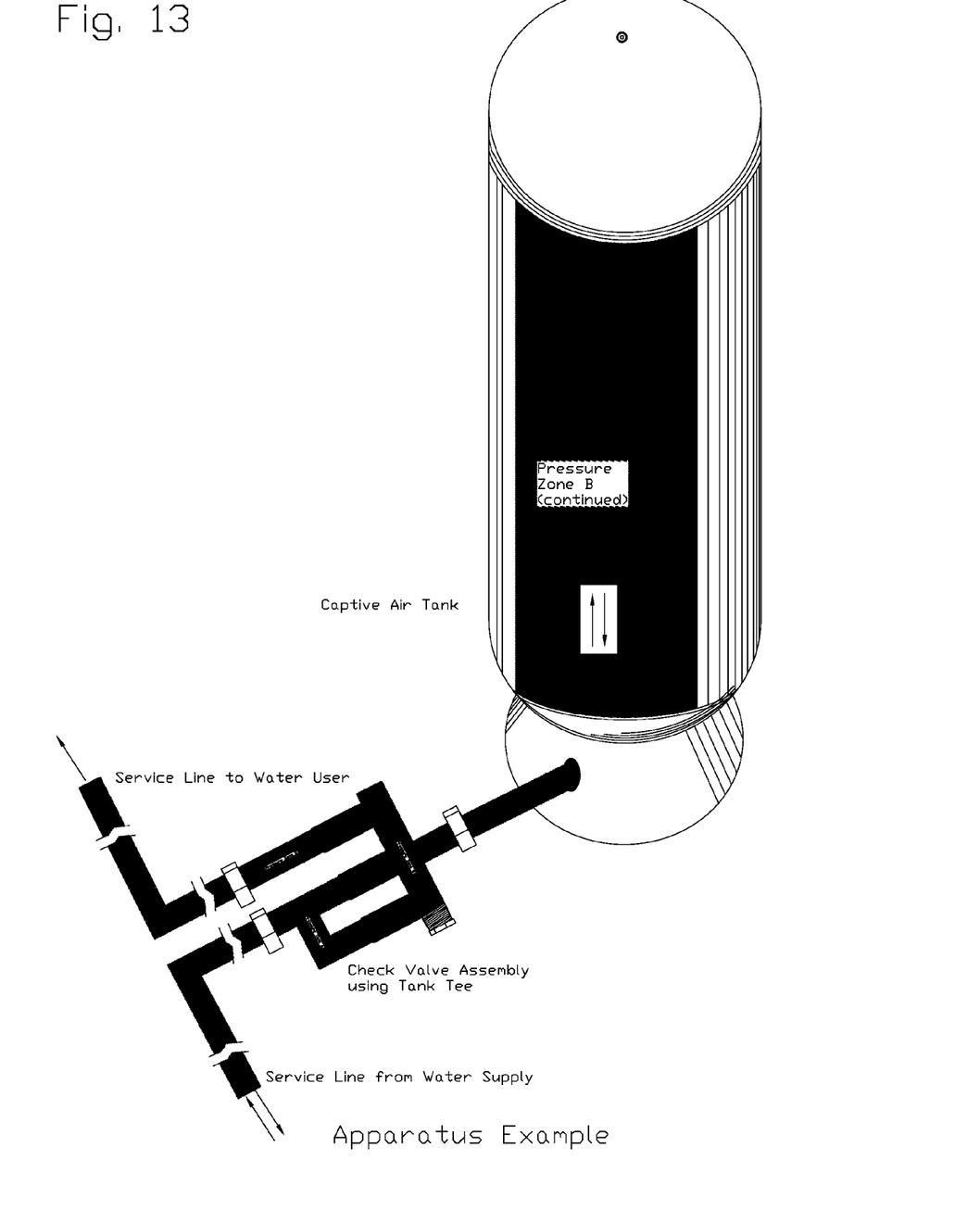
FIG. 13 is a perspective view comprising an embodiment of the apparatus using a tank tee that are commonly used to plumb pressure tanks.
Figure 14:
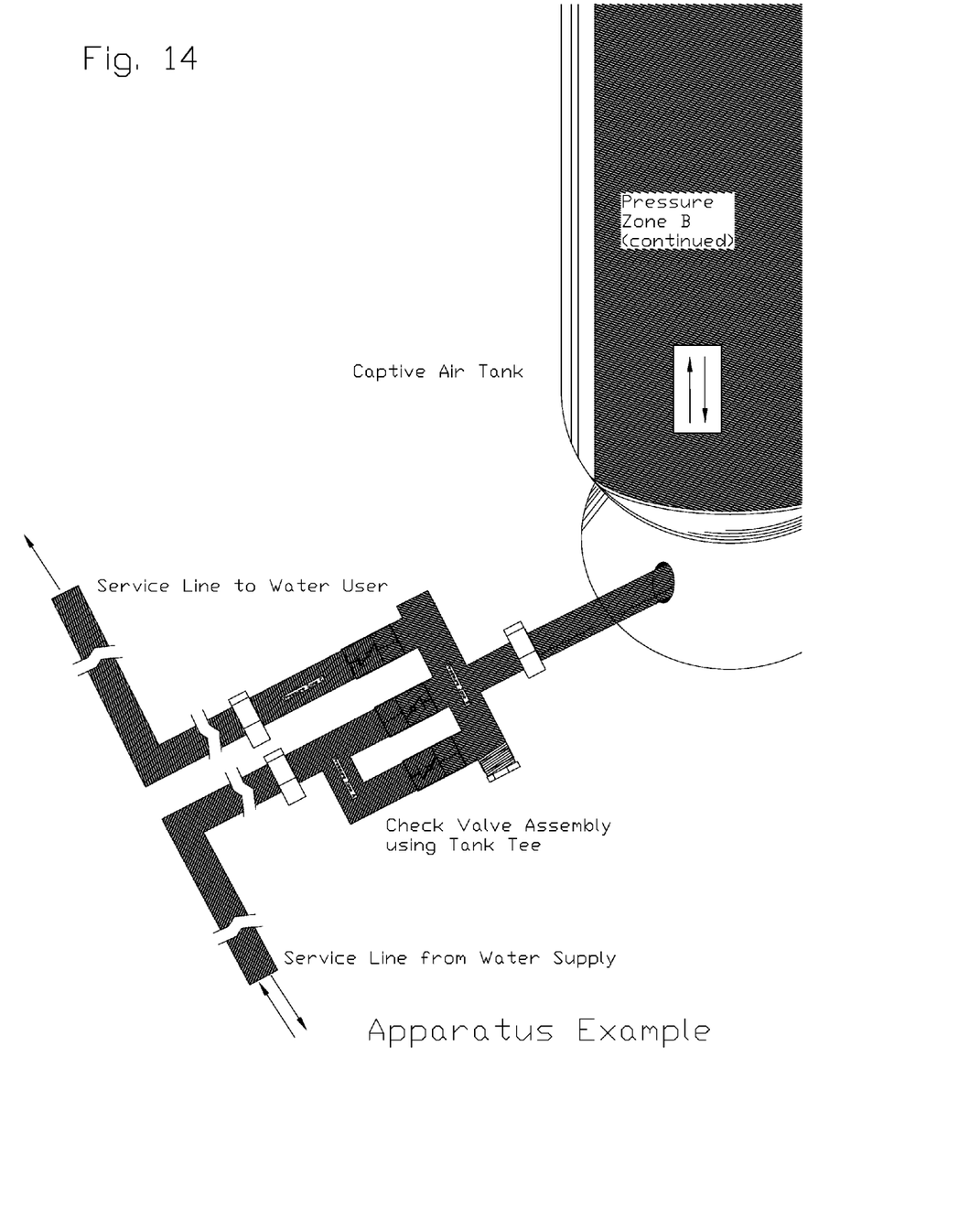
FIG. 14 is a perspective view comprising an embodiment of the apparatus using a tank tee that are commonly used to plumb pressure tanks, that has been enlarged compared to FIG. 13.
Figure 15:
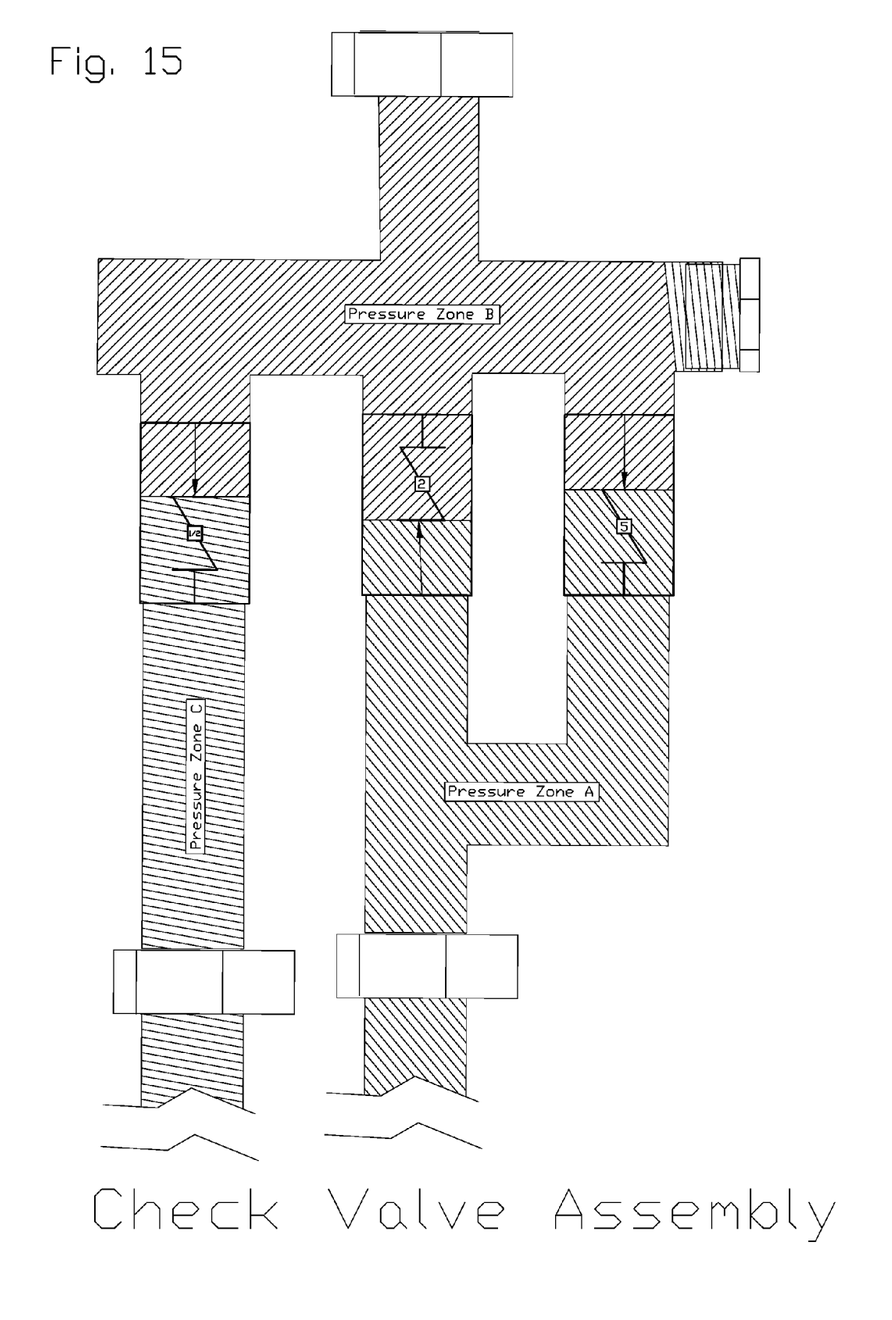
FIG. 15 is a perspective view comprising an enlarged view of an embodiment of the check valve assembly using a tank tee.
Figure 16:
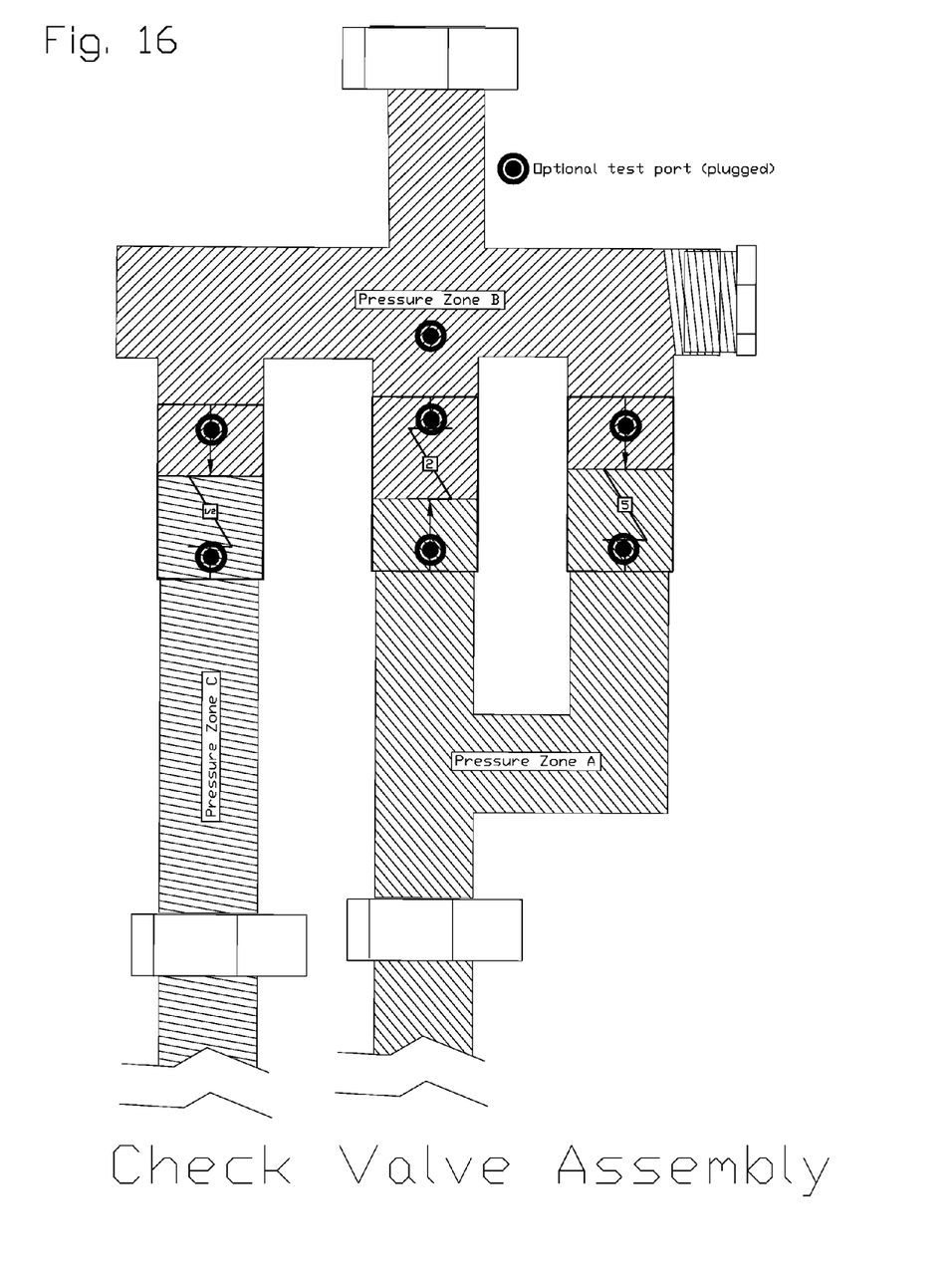
FIG. 16 is a perspective view comprising an embodiment showing optional test ports for the check valve and tank tee assembly shown in FIG. 15.

FIG. 12 there is no water demand. All water flow has stopped. Pressure in all pressure zones has stabilized. All check valves are closed. Captive air tank 4 is fully charged.

OPERATION SUMMARY

In operation the apparatus receives water supplied by a water service line, said water traveling through check valves during relatively high pressure, stores said water in a pressure tank and reserves said water for return through check valves to water users and water main lines using said water service line during relatively low pressure.

I claim:

1. A method for mitigation of water supply demand challenges, said method comprising:
   a. providing a water flow control apparatus comprising:
      i. at least one pressure tank for storing water;
      ii. a first check valve for controlling water flow from a water service line to a water user line and to a pressure tank line;
      iii. a second check valve for controlling water flow from the pressure tank line to a water return line, wherein the water return line is fluidly connected to the water service line; and
      iv. a third check valve for controlling water flow to the water user line;
         wherein the water flow control apparatus is free of electrical connections;
   b. delivering water from the water service line to the water user line;
   c. delivering water from the pressure tank to the water user line when a water user line pressure is below a critical pressure and a water service line pressure is near or at the critical pressure;
   d. delivering water from the pressure tank to the water service line when the water service line pressure is less than a pressure tank pressure; and
   e. refilling the pressure tank with water from the water service line when the pressure tank pressure is relatively lower than the water service line pressure;
      wherein the first check valve automatically opens and closes due to pressure differences between the water service line and the water user line and the pressure tank line, wherein the second check valve automatically opens and closes due to pressure differences between the pressure tank line and the water service line, and wherein the third check valve automatically opens and closes due to pressure differences between the water user line and the water service line and the pressure tank line.

2. The method of claim 1, wherein the first check valve, the second check valve, and the third check valve is selected from a group consisting of spring check valves, swing check valves, and ball check valves.

3. The method of claim 1, wherein the first check valve has a first check valve opening weights wherein the second check valve has a second check valve opening weight, and wherein the third check valve has a third check valve opening weight.

4. The method of claim 3, wherein the second check valve opening weight is increased or decreased relative to the first check valve weight for reserving more or less water for the water user line.

5. The method of claim 3, wherein the first check valve opening weight and the third check valve opening weight are increased or decreased independently to deliver more or less water to the water user line.

6. The method of claim 1, wherein the critical pressure is between about 5 to 10 psi below normal operating pressures.

7. A method for mitigation of water supply demand challenges, said method consisting of:
   a. providing a water flow control apparatus consisting of:
      i. at least one pressure tank for storing water;
      ii. a first check valve for controlling water flow from a water service line to a water user line and to a pressure tank line;
      iii. a second check valve for controlling water flow from the pressure tank line to a water return line, wherein the water return line is fluidly connected to the water service line; and
      iv. a third check valve for controlling water flow to the water user line;
         wherein the water flow control apparatus is free of electrical connections;
   b. delivering water from the water service line to the water user line;
   c. delivering water from the pressure tank to the water user line when a water user line pressure is below a critical pressure and a water service line pressure is near or at the critical pressure;
   d. delivering water from the pressure tank to the water service line when the water service line pressure is less than a pressure tank pressure; and
   e. refilling the pressure tank with water from the water service line when the pressure tank pressure is relatively lower than the water service line pressure;
      wherein the first check valve automatically opens and closes due to pressure differences between the water service line and the water user line and the pressure tank line, wherein the second check valve automatically opens and closes due to pressure differences between the pressure tank line and the water service line, and wherein the third check valve automatically opens and closes due to pressure differences between the water user line and the water service line and the pressure tank line.

* * * * *